United States Patent
Garvey et al.

(10) Patent No.: US 12,165,193 B2
(45) Date of Patent: Dec. 10, 2024

(54) ARTIFICIAL INTELLIGENCE BASED THEME BUILDER FOR PROCESSING USER EXPECTATIONS

(71) Applicant: WEVO, INC., Boston, MA (US)

(72) Inventors: Dustin Garvey, Exeter, NH (US); Shannon Walsh, Boston, MA (US); Frank Chiang, Boston, MA (US); Janet Muto, Boston, MA (US); Nitzan Shaer, Boston, MA (US); Charlie Hoang, Brighton, MA (US); Hannah Sieber, Mendon, MA (US); Nick Montaquila, Boston, MA (US); Jessica Yau, Quincy, MA (US); Joseph Gibson, Boston, MA (US); Mary McMurray, Pinehurst, NC (US); Laurie Delaney, Dedham, MA (US); Andrea Paola Aguilera García, Cambridge, MA (US); Alexa Stewart, Andover, MA (US)

(73) Assignee: Wevo, Inc, Boston, MA (US)

( * ) Notice: Subject to any disclaimer, the term of this patent is extended or adjusted under 35 U.S.C. 154(b) by 21 days.

(21) Appl. No.: 17/981,252

(22) Filed: Nov. 4, 2022

(65) Prior Publication Data
US 2024/0144356 A1    May 2, 2024

Related U.S. Application Data

(63) Continuation of application No. 17/979,231, filed on Nov. 2, 2022.

(51) Int. Cl.
*G06Q 30/0203*    (2023.01)
*G06Q 30/0201*    (2023.01)
*G06Q 30/0601*    (2023.01)

(52) U.S. Cl.
CPC ..... *G06Q 30/0641* (2013.01); *G06Q 30/0201* (2013.01); *G06Q 30/0203* (2013.01)

(58) Field of Classification Search
USPC ........................................................ 705/7.33
See application file for complete search history.

(56) References Cited

U.S. PATENT DOCUMENTS 8,462,996 B2    6/2013  Moon et al.
10,942,625 B1   3/2021  Li et al.
(Continued)

OTHER PUBLICATIONS

Smith et al., Closing the Loop User-Centered Design and Evaluation of a Human-in-the-Loop Topic Modeling System, 2018 (Year: 2018).*

(Continued)

*Primary Examiner* — Allison M Robinson
(74) *Attorney, Agent, or Firm* — Invoke

(57) ABSTRACT

Techniques are described herein for selecting, curating, normalizing, enriching, and synthesizing the results of user experience (UX) tests. In some embodiments, a system receives input defining or modifying a theme schema for classifying results of user experience tests. Responsive to receiving the input, the system trains a themer model based at least in part on example classifications in a training dataset, where the classifications map results to themes within the theme schema. When a new set of results for a user experience test is received, the trained machine learning model may generate a set of predicted themes to classify the test results. The output of the model may be used to render user interfaces and/or trigger other actions directed to optimizing a product's design.

19 Claims, 8 Drawing Sheets

(56) References Cited

U.S. PATENT DOCUMENTS

| | | |
|---|---|---|
| 11,250,069 B1 | 2/2022 | Bianchi et al. |
| 11,893,358 B1 | 2/2024 | Lakshmikanthan et al. |
| 2010/0138808 A1 | 6/2010 | Kim et al. |
| 2011/0167054 A1 | 7/2011 | Bailey et al. |
| 2013/0246382 A1 | 9/2013 | Cantrell |
| 2013/0268534 A1* | 10/2013 | Mathew .................. G06F 16/35 707/740 |
| 2015/0095017 A1 | 4/2015 | Mnih et al. |
| 2015/0363388 A1 | 12/2015 | Herdagdelen et al. |
| 2017/0132676 A1 | 5/2017 | Mediratta et al. |
| 2017/0242919 A1 | 8/2017 | Chandramouli et al. |
| 2017/0308960 A1 | 10/2017 | Mascaro et al. |
| 2018/0046570 A1 | 2/2018 | Kaulgud et al. |
| 2018/0174070 A1* | 6/2018 | Hoffman .................. G06N 7/01 |
| 2018/0196796 A1 | 7/2018 | Wu |
| 2018/0315494 A1 | 11/2018 | Kolde et al. |
| 2019/0050875 A1* | 2/2019 | McCord ................ G06F 40/237 |
| 2019/0129397 A1* | 5/2019 | Horiwaki .......... G05B 19/41885 |
| 2020/0004564 A1 | 1/2020 | Calegari et al. |
| 2020/0050949 A1 | 2/2020 | Sundararaman et al. |
| 2020/0065389 A1* | 2/2020 | Lu ........................... G06F 17/16 |
| 2020/0175039 A1 | 6/2020 | Bhadury et al. |
| 2020/0226479 A1 | 7/2020 | Germanakos et al. |
| 2020/0279017 A1 | 9/2020 | Norton et al. |
| 2020/0311214 A1 | 10/2020 | Chatterjee et al. |
| 2021/0150594 A1* | 5/2021 | Zhu ..................... G06Q 30/0282 |
| 2021/0407312 A1 | 12/2021 | Mestres et al. |
| 2022/0050877 A1 | 2/2022 | Kang et al. |
| 2022/0067763 A1* | 3/2022 | Lee .................... G06Q 30/0204 |
| 2022/0092651 A1* | 3/2022 | Sureshkumar ..... G06Q 30/0282 |
| 2022/0198157 A1 | 6/2022 | Li et al. |
| 2022/0374597 A1 | 11/2022 | Bellegarda et al. |
| 2022/0398635 A1* | 12/2022 | Jungmeisteris .... G06Q 30/0282 |
| 2023/0025371 A1 | 1/2023 | Syed et al. |
| 2023/0085195 A1 | 3/2023 | Karri et al. |
| 2023/0098783 A1 | 3/2023 | Zaremoodi et al. |
| 2023/0161972 A1 | 5/2023 | Hrm et al. |
| 2023/0244968 A1 | 8/2023 | Gurin et al. |

OTHER PUBLICATIONS

Kang et al., "Continual Retraining of Keystroke dynamics Based Authenticator", International Conference on Biometrics—ICB2007, pp. 1203-1211 (Year: 2007).

Berends, Jasper, et al. "Specifying and Testing Conversational User Interfaces." (2017). (Year: 2017).

* cited by examiner

ARTIFICIAL INTELLIGENCE BASED THEME BUILDER FOR PROCESSING USER EXPECTATIONS

INCORPORATION BY REFERENCE; DISCLAIMER

The following application is hereby incorporated by reference: application Ser. No. 17/979,231 filed on Nov. 2, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates, generally, to user experience testing. In particular, the present disclosure relates to selecting, curating, normalizing, enriching, and synthesizing the results of user experience tests.

BACKGROUND

User experience (UX) design encompasses tools and applications for optimizing how users interact with a system, which may be comprised of physical and/or digital interfaces. Component tools allow designers and researchers to compose and administer UX tests, the results of which may be processed to assess and understand user experiences with a product. For example, the component tools may allow a user to compose and administer a survey or questionnaire that prompts a sample set of users to describe and/or otherwise evaluate the user's experience with a product. A UX test may also be composed to monitor and capture various metrics associated with a user's interaction with a product, such as how long it takes the user to perform a certain task and how long a user engages with the product. Test results may include qualitative and quantitative data that provide insights into user experiences with a product. Such insights may help isolate problematic areas of a product's design and guide product design updates to improve the overall experience when using a product.

User researchers and product designers generally have two options when performing UX testing. The first is to compose and administer the tests using existing or custom-built frameworks. For example, a framework may allow users to create custom survey questions and target a panel with particular demographics. In this scenario, the researcher bears the burden of determining how the tools should be composed and how the results should be analyzed. The researcher may not have the time or expertise to effectively run UX tests and identify the highest-quality test results. Poorly crafted tests and analysis may lead to suboptimal product design choices and the inefficient use of resources.

Researchers may also outsource UX testing to a third-party service provider. In this scenario, the service provider may use proprietary tools to perform the UX tests and analyze the results. Third-party service providers may leverage their expertise in conducting and administering tests. However, it may be difficult for service providers to identify the test results that are most relevant to the specific customer. The analysis is often decomposed into manual tasks that are tightly coupled to the specific customer. As a result, extracting useful and actionable insights is typically an expensive, cumbersome, and inefficient process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
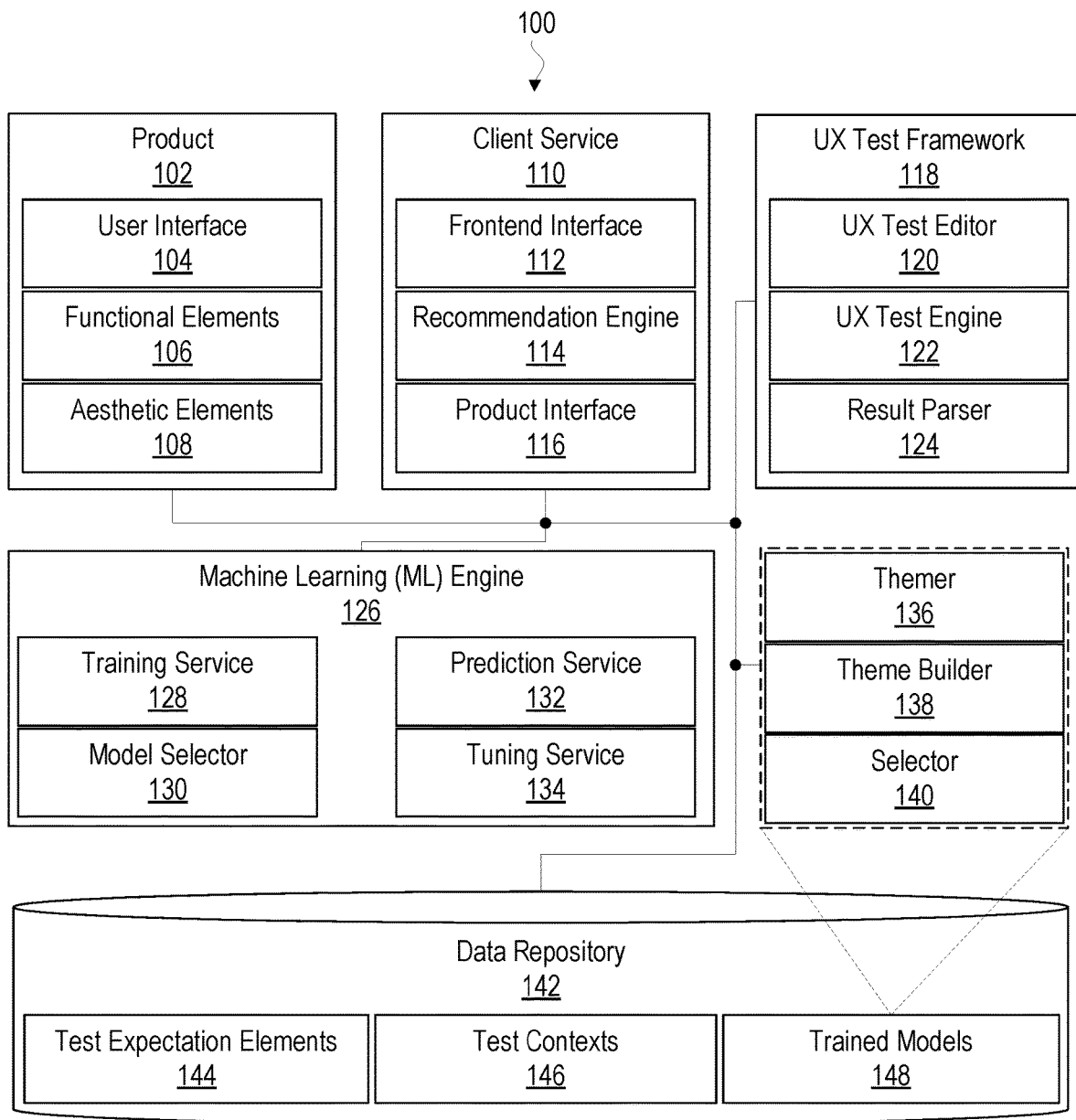
FIG. 1 illustrates a system architecture for discovering and documenting user expectations in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for selecting, curating, normalizing, enriching, and synthesizing the results of user experience (UX) tests. The techniques may automate one or more aspects of UX testing, increasing the scalability of UX testing systems and methodologies. The techniques may further provide insights into UX test results that are not readily apparent from the raw result data. The insights may be used to render user interfaces and/or to trigger other system actions, which may optimize product design feedback, analysis, and development process flows.

In some embodiments, a system receives, normalizes, and synthesizes a set of user expectation elements collected from a set of one or more UX tests. An expectation element, as used herein, may include a set of unstructured text that describes expectations and outcomes associated with a user's experience with a product. For example, an expectation element may include an expectation quotation that describes the user's expectations with respect to a product and an outcome quotation that describes reasons why an expectation was satisfied or not. As these data are unstructured and not confined by any schemas, the variability in UX test results may be significant. As a result, the quality of the expectation elements may vary significantly, and having an analyst sift through thousands or more such quotations is inefficient. Further, many insights may not be readily apparent to the analyst from the raw, unstructured data. Systems and methods are described herein for leveraging artificial intelligence, including machine learning, to synthesize UX test results, extract the most insightful expectation elements, and deliver a set of synthesized expectation results with respect to the design of a product. Thus, system scalability may be increased, allowing for faster and greater processing capabilities of UX test result data streams while enhancing the insights gleaned from the UX test results.

In some embodiments, a system includes a delivery facet and a learning facet. The delivery facet may include a themer that predicts and assigns themes to a set of user expectation elements and a selector that selects representative expectation elements for the predicted themes. A theme may correspond to a label that classifies a user expectation element according to a schema. For example, a theme may correspond to a facet of a product's functional or aesthetic design, the price of the product, the available information about the product on a webpage, or other attributes associated with the product. The themer may be applied to an expectation element to estimate, based on patterns in the expectation and/or outcome quotations, a probability distribution that the expectation element is associated with various themes in the schema. The delivery system may further determine the outcome distribution of user expectations with respect to the different themes, including which user expectation themes were most likely to be satisfied, somewhat satisfied, and unsatisfied. The delivery system may present a normalized and synthesized set of results based on the distribution to focus the analyst's attention on the user expectation themes that are most relevant to a product's design.

The selector may select representative expectation elements for a theme based on relevance and/or quality scores. In some embodiments, the selector may select different expectation elements to represent different expectation outcomes for a theme. For example, the selector may select different sets of outcome quotations to represent expectations that were satisfied, partially satisfied, or not satisfied for a given theme. The selected outcome quotations may represent the most insightful reasons why user expectations were met, somewhat met, or unmet with respect to a user experience with the product.

In some embodiments, the learning facet of the system includes a machine learning engine that trains the themer and selector using training datasets. The themer training dataset may include example expectation elements and theme labels. The machine learning engine may train the themer to learn and extrapolate from signals that are predictive of particular themes within the user expectation data. For example, the themer may learn patterns in the keywords of expectation and/or outcome quotations that are correlated, uncorrelated, or inversely correlated with a given theme. The themer may then extrapolate from the learned patterns to estimate the likelihood that an expectation element should be assigned to each theme in a schema.

The selector training dataset may include the expectation elements, themes, and labeled selection scores. The machine learning engine may train the selector to learn from signals that are predictive of selection scores within the user expectation data. For example, the selector may learn from patterns in the keywords of expectation and/or outcome quotations and how the patterns affect the selection score for a given context. The selector may then extrapolate from the learned signals to estimate selection scores for new expectation elements.

The machine learning engine may train multiple themer and/or selector models for different contexts. For example, different models may be trained depending on one or more attributes of a product, such as the industry in which the product is used, the target consumer base of the product, the product type, and/or the types of features included in the product. Additionally or alternatively, different selector models may be trained for each theme and/or for each theme outcome. Labeled training data may be divided and grouped along one or more such dimension to build the set of models.

By training multiple machine learning models along different dimensions, different models may learn and extrapolate from different signals that are specific to a particular domain. For example, a set of expectation elements that are predictive of a theme in one context may not be relevant to the theme in a different context. As another example, an outcome quotation may be relevant to a theme in one context but not another. Thus, given the same expectation element as input, different models may predict different theme labels and/or select different representative outcome quotations.

The system may use machine learning to adapt to changing conditions across different domains without requiring a developer to update the underlying system code. For example, the system may receive feedback on the assigned themes and/or selected quotations with respect to one or more domains. In response to the feedback, the machine learning engine may update one or more model parameters for the themer and/or selector. The system may further train or retrain a model using data that is local in time such that the model "forgets" data that is older than a threshold age. Thus, the system may pick up on trending and evolving patterns as the standards and expectations for user experiences change over time.

In some embodiments, the system selects and applies one or more trained machine learning models to newly received UX test results. The system may select a model (or set of models) to apply to a given set of expectation elements based on one or more dimensions associated with the data, the UX test, the type of user experience, and/or the product for which the UX test was conducted. Each model may output a predicted label, which may correspond to a predicted theme and/or selection score for the expectation element.

The system may execute one or more operations based on the model predictions. Examples include rendering user interfaces, populating work queues with UX expectations and outcomes for further review by an analyst, generating analytics with respect to the strengths and/or weaknesses of a product's design, and/or recommending/deploying updates to a product. The techniques may reduce the turnaround time from receiving UX test results to identifying and implementing actionable insights for improving a product's design.

One or more embodiments described in this Specification and/or recited in the claims may not be included in this General Overview section.

2. System Architecture

FIG. 1 illustrates a system architecture for discovering and documenting user expectations in accordance with some embodiments. As illustrated in FIG. 1, system architecture 100 includes product 102, client service 110, user experience (UX) test framework 118, machine learning (ML) engine 126, themer 136, theme builder 138, selector 140, and data repository 142. In some embodiments, system architecture 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Product 102 refers to an item or service with which users may interact. Examples include articles of manufacture, software applications, cloud computing services, websites, virtual assistants, and other computing-based systems. Product 102 includes user interface 104 for interacting with one or more users. In the context of a computing system, service, or application, user interface 104 may render user interface elements and receive input via user interface elements. Example user interfaces include a graphical user interface (GUI), a command line interface (CLI), a haptic interface, and a voice command interface. Example user interface elements include checkboxes, radio buttons, dropdown lists, list boxes, buttons, toggles, text fields, date and time selectors, command lines, sliders, pages, and forms. User interfaces for other types of products may include buttons, levers, knobs, dials, and/or other physical elements through which a user may manipulate and interact with product 102.

In some embodiments, product 102 includes functional elements 106 and aesthetic elements 108, which may affect the user experience with respect to product 102. Functional elements 106 may include user interface controls through which the user may operate product 102 and/or affect the output of product 102. Functional elements 106 may further comprise backend processes and/or systems with which a user does not directly interact, but which may affect a user's experience with product 102, such as a perceived responsiveness or quality of product 102. Aesthetic elements 108 may generally comprise nonfunctional components of product 102 including the look and feel of user interface 104 and/or other visual design elements of product 102.

UX test framework 118 includes components for composing and running UX tests. The components may include UX test editor 120, UX test engine 122, and result parser 124. A UX test may comprise applications, tools, and/or processes for evaluating the performance of various facets of one or more user experiences with product 102. For example, a UX test may comprise a survey or questionnaire. Users of a website or a mobile application may be prompted to complete the UX test to evaluate their experience with product 102, which may be the website or application itself or a separate product. If the user accepts the prompt, the user may be redirected to a webpage with a set of queries to describe and/or rank various facets of the user experience with product 102.

Additionally or alternatively, a UX test may obtain performance data for one or more UX facets using mechanisms for tracking how a user interacts with product 102. For example, scripting tags that embed executable code in a website or backend processes, such as daemons, may track and collect metrics and/or other information about user interactions with product 102. Example metrics may include how long it takes a user to first interact with a user interface element, how long it takes a user to complete a function, how long a user engages with product 102, how long it takes for pages of user interface 104 to load, which products features are most frequently accessed, and which product features are least frequently accessed.

Additionally or alternatively, a UX test may obtain information about user experiences from other data sources. For example, a web scraper may crawl one or more websites for user reviews of a product to extract information about which product features are viewed most positively, which product features are viewed most negatively, what scores have been assigned for different features of the product, and what overall product score has been assigned. Additionally or alternatively, the UX test may scrape social media sites for posts tagged with a product identifier and extract information from the posts about how users interact with the product. In yet another example, a UX test may search customer databases and/or other sources to determine what percentage of users have returned a product, submitted a customer support ticket, or submitted a product complaint. A UX test may assign scores based on the extracted information using a scoring function or machine learning, where a UX test score quantifies one or more user experiences with respect to one or more facets of the user experience. Although only one product is illustrated in FIG. 1, a given UX test may be run for several different products and several different UX tests may be run for the same product.

UX test editor 120 is a tool through which users may compose and customize UX tests. For example, UX test editor 120 may include one or more GUI elements through which a user may select predefined survey questions, input new questions, define scripts for capturing performance metrics, and/or otherwise customize test applications to evaluate user experiences with product 102. UX test editor 120 may further allow users to define parameters associated with running a UX test, such as what segment to target, what platform to use running the test, and/or other parameters controlling how the UX test is run.

UX test engine 122 runs tests defined through UX test editor 120. A UX test may include a query mechanism to prompt or search for data describing or quantifying one or more facets of a user experience. For example, UX test engine 122 may prompt a sample set of visitors to a webpage to complete a survey describing and/or ranking various facets of a user experience with product 102. As another example, UX test engine 122 may capture webpage usage metrics from the set of visitors using scripting tags and/or scrape review sites for information describing product 102, as previously described. The tests may be run in accordance with the parameters input through UX test editor 120. The results of a UX test may include qualitative elements describing the user experience and/or quantitative elements that quantify the user experience.

In some embodiments, UX tests allows users to input unstructured and/or structured qualitative data describing the user's experience with product 102. For instance, a UX test may capture an "expectation quote" that describes the user's expectations without being confined to a schema, an "outcome quote" that describes the outcome for an associated expectation (also without being confined to a schema), and an outcome selected from a predefined schema (e.g., "fully met", "somewhat met", "unmet", etc.). The triplet of the unstructured expectation quote, unstructured outcome quote, and selected outcome may be part of an expectation element collected by UX test framework 118. A UX test may collect one or more expectation elements from one or more users. In other embodiments, an expectation element may include additional information associated with a user's expectations with product 102 and/or may omit one or more items from the triplet.

Result parser 124 parses the results of UX tests to extract expectation elements from the result set. For example, result parser 124 may extract the expectation quotes, outcome quotes, and associated outcomes. Result parser 124 may further extract additional information about individual expectation elements and/or groups of expectation elements, including attributes about the author of a quotation and what quantitative score the respondent gave to a facet of the user experience that is relevant to the expectation quotation.

ML engine 126 uses machine learning to build models based on sample UX test data. ML engine 126 may include training service 128 for building the set of ML models, model selector 130 for selecting ML models to apply based on context, prediction service 132 for applying ML models to results extracted by result parser 124, and tuning service 134 to make runtime adjustments to ML models based on feedback.

In some embodiments, ML engine 126 trains, tunes, and applies themer 136 and selector 140. Themer 136 may be trained to predict themes for test expectation elements. A theme may correspond to a category or other label that classifies an expectation element. Themes may be part of a schema, and themer 136 may map an expectation element, all or a portion of which (e.g., an expectation quote and/or outcome quote) may not follow any schema or structure, to predicted themes within the theme schema.

Theme builder 138 may be used to add, delete, and/or edit themes within a theme schema. When a theme schema is modified, ML engine 126 may update themer 136, such as by retraining and/or tuning the model. Once themer 136 has been updated, it may be used to update previous theme predictions and/or generate new predictions to classify/reclassify expectation elements based on the modified schema.

Selector 140 may predict selection scores for expectation elements associated with a theme. For example, selector 140 may estimate a score for an expectation quote and/or an associated outcome quote. The scores may be used to select representative expectation elements for a given theme. The predicted selection scores and/or themes may be used to render user interfaces, provide insights into product optimizations, present recommended updates to product 102, and/or perform other automated actions as described further herein.

Data repository 142 stores and fetches data including test expectation elements 144, test contexts 146, and trained models 148. In some embodiments, data repository 142 is any type of storage unit and/or device (e.g., a file system, database, collection of tables, or any other storage mechanism) for storing data. Further, data repository 142 may include multiple different storage units and/or devices. The multiple different storage units and/or devices may or may not be of the same type or located at the same physical site. Further, data repository 142 may be implemented or executed on the same computing system as one or more other components of system architecture 100. Alternatively or additionally, data repository 142 may be implemented or executed on a computing system separate from one or more other system components. Data repository 142 may be communicatively coupled to remote components via a direct connection or via a network.

Client service 110 may comprise applications, tools and systems used by product designers and/or third-party service providers that run specialized UX tests. In some embodiments, client service 110 comprises frontend interface 112, recommendation engine 114, and product interface 116. Frontend interface 112 may comprise a user interface for presenting analytics, recommended actions, and/or other information based on the predictions. For example, frontend interface 112 may generate and render interactive charts that allow a user to compare predicted UX test scores for product 102 to performance benchmarks and view the most relevant test themes and representative expectation elements. The user may view which facets are underperforming relative to peer products, the most informative expectations and outcomes describing why the expectations were not satisfied, and recommended actions to address the problems.

Recommendation engine 114 may comprise logic for generating recommendations. For example, recommendation engine 114 may determine which facets are underperforming and which solutions are predicted to improve performance with respect to the facet. Recommendation engine 114 may leverage analytics and/or machine learning to generate the recommendations. For instance, recommendation engine 114 may learn patterns within the expectation elements and UX benchmarks for various products. Recommendation engine 114 may apply a trained model to a set of representative expectation elements and/or themes for product 102 to recommend product updates that are predicted to improve the product's benchmark scores.

Product interface 116 may be communicatively coupled to product 102 and allow client service 110 to invoke and/or execute functions on product 102. For example, product interface 116 may include an application programming interface (API) endpoint to send requests to a software application or a service to execute a requested change in the user interface. As another example, product interface 116 may invoke an editor to change a webpage associated with product 102. The requests and functions that are invoked may be directed to improving underperforming facets of product 102.

The components illustrated in FIG. 1 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components illustrated in FIG. 1, may be implemented as a cloud service or a microservice application. Tenants may subscribe to a cloud service to track UX benchmark scores of a product, view the most helpful qualitative data highlighting the product design features that excelled or underperformed, and implement recommended actions to improve the product design. Additional embodiments and examples relating to computer networks are described below in Section 7, titled Computer Networks and Cloud Networks. Additional embodiments and examples relating to computer networks are described below in Section 8, titled Microservice Applications.

3. Artificial Intelligence Guided Discovery and Delivery of User Expectations

When UX test results are received, the results may include expectation elements that describe new user expectations and outcomes. The expectation elements may be unique and not previously encountered by a system. For example, the UX test results may include expectation and outcome quotations that are not included in any previous UX tests or training examples. As these data are unstructured and not confined by any schemas, the variability in UX test results may be significant. As a result, the quality of the expectation elements may vary significantly. Having an analyst sift through thousands or more such results is inefficient. Further, many insights may not be readily apparent to the analyst from the raw unstructured data. The system may leverage artificial intelligence, including machine learning, to synthesize UX test results, extract the most insightful expectation elements, and deliver a set of synthesized expectation results with respect to the design of product 102.

Figure 2:
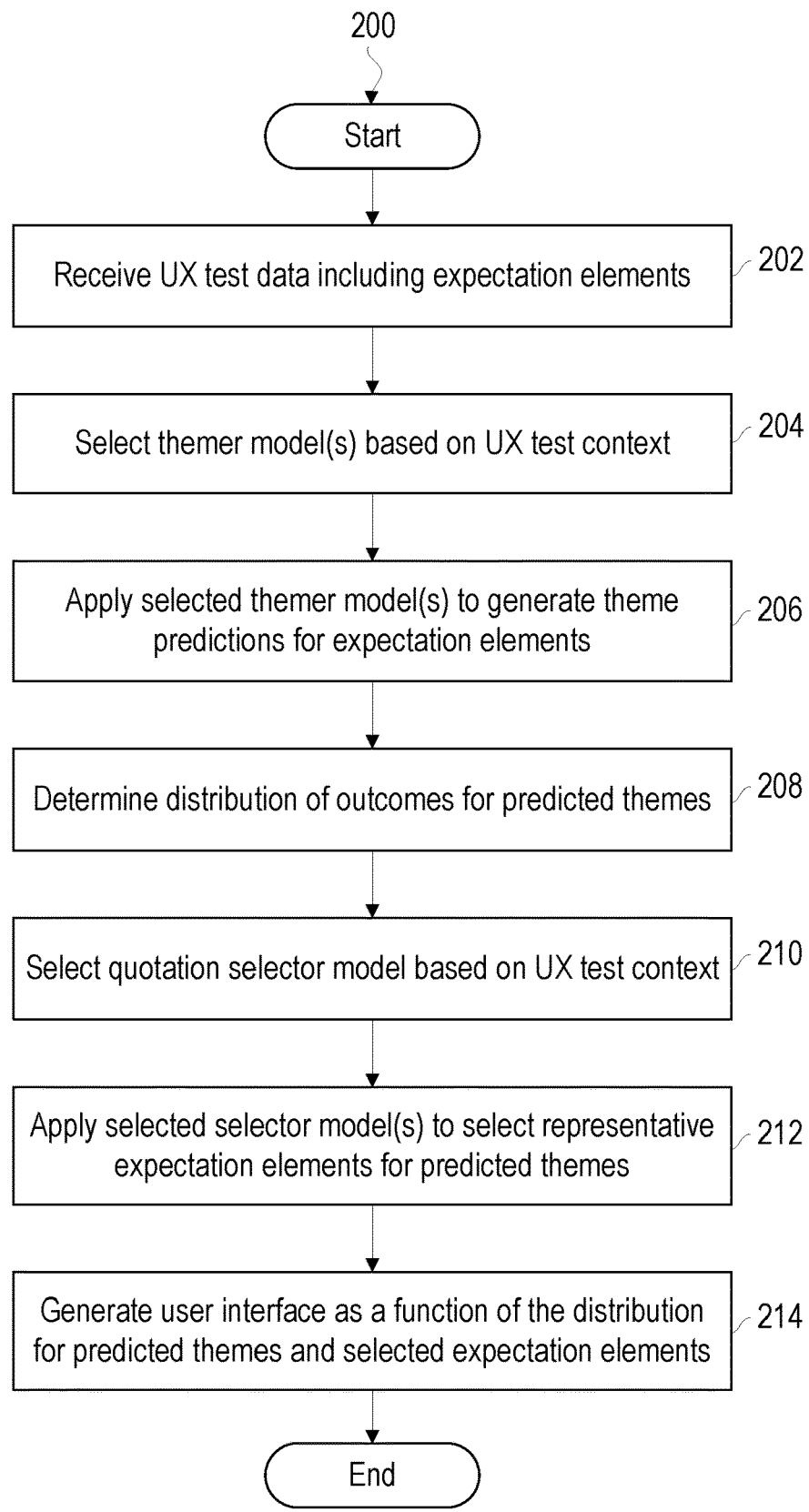
FIG. 2 illustrates a process that uses machine learning to predict themes and select representative quotations for a set of user expectations in accordance with some embodiments.

FIG. 2 illustrates process 200 that uses machine learning to predict themes and select representative quotations for a set of user expectations in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

At operation 202, process 200 receives UX test data including expectation elements. An individual UX test may allow a user to specify one or more expectations with respect to product 102. As previously noted, each expectation element may include an unstructured expectation quotation, an unstructured outcome quotation, and an outcome selected from a predefined outcome schema. For example, the user may describe expectations that the user had before interacting with product 102 regarding product features, price, usability, value, and/or other facets. The unstructured data may comprise text that does not conform to any schema. Without restricting the input to a predefined schema, the choice of words, grammatical structure, word sequence, and quotation length may be highly variable and difficult to predict.

At operation 204, process 200 selects one or more themer models based on a UX test context. In some embodiments, process 200 may determine the context based on one or more UX test attributes (e.g., what types of questions are included in the UX test, what is the target audience of the UX test, etc.), the product being tested (e.g., what features are included in the product, how the product is classified/categorized, etc.), the industry associated with the product, and/or the respondent that submitted the question (e.g., age, income, education, gender, etc.). UX test framework 118 may track these attributes during runtime as tests are conducted. Process 200 may then select an ML model that is mapped to the dimensional attributes defining the context. For example, process 200 may select a business-to-business (B2B) model if the product or UX test is directed to sophisticated enterprise customers and a business-to-consumer (B2C) model if directed to retail consumers. As another example, process 200 may select the model based on the product type, industry, survey questions included in the UX test, and/or other dimensional attributes defining the context.

In some cases, process 200 may select multiple themer models if multiple contexts apply. Selecting multiple models may allow an analyst to view different predicted themes and insights across different domains and dimensions. Theme schemas may vary between different domains. For example, the set of available themes defined for an industry-based themer may be different than the set of available themes for a themer tied to a specific product type. Thus, different themers may map the same expectation element for different themes depending on the context for which the themer model is generating predictions.

Additionally or alternatively, a hierarchy of themer models and/or theme schemas may be defined. For example, an industry-based model may be tied to multiple product type models for different types of products competing in the same industry. The industry-based model may predict themes for a parent schema that is applicable across all product types. The industry-based schema may be augmented by the product type schemas that are relevant to only a subset of one or more product types. The industry-based themer may be selected to generate predictions for industry themes, and the product-type themer may be selected to generate predictions specific to the specific class of product. The selection and mix of themers may vary depending on the particular implementation.

At operation 206, process 200 applies the one or more selected themer models to generate theme predictions for each expectation element. In some embodiments, process 200 applies the model by generating a text document for each expectation element collected from the UX test and passing the text document to one or more context-specific ML models trained to predict themes based on learned patterns. The text document may include a normalized set of expectation data, which may include the expectation quotation, the outcome quotation, and the outcome.

In some embodiments, a context-specific themer outputs a predicted theme for each expectation element document passed into the model. The underlying ML model may compute a conditional probability distribution that includes probabilities that the expectation element should be assigned to each theme in a context-specific schema. The themer may then output the theme with the highest probability.

As previously noted, in some embodiments, multiple themers may be applied to the same expectation element. When multiple models are applied to the same expectation element, each themer may output a predicted theme. The predictions for a given element may vary based on the theme schemas, which may also be context specific, and the context-specific patterns learned from the training datasets.

In some embodiments, the predicted themes may be presented via a user interface to an analyst for review before proceeding with the additional steps in the process. The interface may include elements that allow the user to reassign themes if the prediction is deemed incorrect and assign themes to elements if the ML model did not have a sufficient signal to generate a prediction. In the latter case, the label for the associated expectation element may be unclassified. The feedback may be provided to update the ML models as described in further detail below. In other embodiments, the process may proceed without any review of the predicted themes.

At operation 208, process 200 determines a distribution of outcomes for the predicted themes. In some embodiments, process 200 computes the distribution by aggregating the selected outcomes for each assigned theme. For example, process 200 may compute what percentage of user expectations mapped to a given theme were met, somewhat met, and unmet. Additionally or alternatively, process 200 may determine the counts and percentages of the expectation elements assigned to each theme.

In some embodiments, process 200 may assign relevance scores to themes based on count values and/or other factors. For example, process 200 may assign a relevance score such that themes with higher count values have a higher score and are determined to be more relevant for providing insights into the product designs. As another example, process 200 may weight the scores based on the outcome distribution for the elements and/or a quality score assigned to the outcome quotations. Themes with a higher negative outcome distribution and/or higher quality outcome quotations may be more helpful for guiding product design decisions.

At this stage, process 200 has normalized and synthesized the incoming data to an extent that theme histograms and in situ outcome distributions may be rendered. Process 200 (or a separate process) may render these items before or in parallel with execution of the subsequent operations. The following operations relate to selecting example quotations authored by product users to understand the reasons for the outcomes.

At operation 210, process 200 selects one or more selector model(s) based on a UX text context. The UX text context may be the same context used in the selection of the themer models or a different context, depending on the particular implementation. For example, different selectors may be trained and selected for B2B or B2C contexts. As another example, different selectors may be used depending on the industry, product type, respondent, and/or other UX test attributes. Additionally or alternatively, different selectors may be selected for different themes and/or theme outcomes. For instance, one model may be trained to select quotations for met expectations, another for somewhat met expectations, and another for unmet expectations.

In some cases, process 200 may select multiple selector models if multiple contexts apply. Selecting multiple models may allow an analyst to view different exemplar quotations across different themes, domains and dimensions. For example, an industry-based selector may select outcome quotations based on patterns learned across the industry, and a product-type selector may select outcome quotations based on more product-specific patterns. The selection and mix of selectors may vary depending on the particular implementation.

At operation 212, process 200 applies the one or more selected selector models to select representative expectation elements for the set of expectation themes. In some embodiments, process 200 applies the model by generating a text document for each expectation element assigned to a theme and passing the text document to one or more context-specific ML models trained to select quotations for the theme.

In some embodiments, a context-specific selector outputs a set of expectation elements that have been selected for a given theme and theme outcome. The underlying ML model may compute a selectability score for each expectation element. In some cases, an expectation element may have little or no signal for selectability. The selector may remove these elements by retaining only elements with a selectability score above a threshold. Additionally or alternatively, the selector may select the top n elements when sorted by selectability score for each theme outcome. The number of elements may be selected with an expectation that an analyst will remove one or more of the representative quotations. For example, the selector may select the top nine quotes if the analyst expects to present the top six quotes to the customer. This allows the analyst to have some input on the final set of quotes without requiring the analyst to sift through all of the UX test results, which is generally not feasible. Further, the input by the analyst, including which expectation quotes were retained and which were removed by the analyst, may be used to update and fine-tune the underlying ML model.

As previously noted, in some embodiments, multiple selectors may be applied to the same expectation element. When multiple models are applied to the same expectation element, each selector may output a different selection score. The expectation element may be selected as representative for the theme outcome in one context but not another.

In some embodiments, applying an ML model (e.g., a themer or selector model) includes generating an ML vector for the expectation element based on the unstructured text. The ML vector may be generated using a word embedding model, such as Word2Vec, or through other encoding schemes. Process 200 may then perform a forward pass of the ML vector through the neural language model. With a transformer model, for example, the forward pass may include feeding the ML vector through one or more encoder blocks to generate attention vectors based on learned patterns. The vector representations output by the encoders may then be fed through one or more decoder blocks to generate the prediction.

In other embodiments, other ML models may be applied to generate the prediction, including other types of neural language models. Such models may be trained using machine learning algorithms that can be iterated to learn a target model f, where the model maps a set of input variables to an output variable using a set of training data. Various types of algorithms may be used, such as linear regression, logistic regression, linear discriminant analysis, classification and regression trees, naïve Bayes, k-nearest neighbors, learning vector quantization, support vector machines, bagging and random forest walkthroughs, boosting, backpropagation, and/or clustering. The model output may include an estimated label representing a prediction on the theme or selectability of an expectation element.

At operation 214, process 200 generates and renders a user interface as a function of the distribution for the predicted themes and the selected expectation elements. In some embodiments, the user interface includes only the top themes and top n elements for each theme outcome. The other themes and quotations may be hidden, inaccessible, or otherwise not included in the user interface that is rendered. Additionally or alternatively, the user interface may include interactive charts, such as interactive histograms and bar charts, that allow a user to view the distribution of themes and outcomes. The interactive interface and charts may further allow the user to drill-down and perform further analysis as to the reasons why user expectations were satisfied, partially satisfied, or unsatisfied. The rendered user interface may optimize an analyst's workflow by focusing their attention on the expectation themes and outcomes that are most likely to provide insights into what is working and what is problematic with a product's design.

Figure 3:
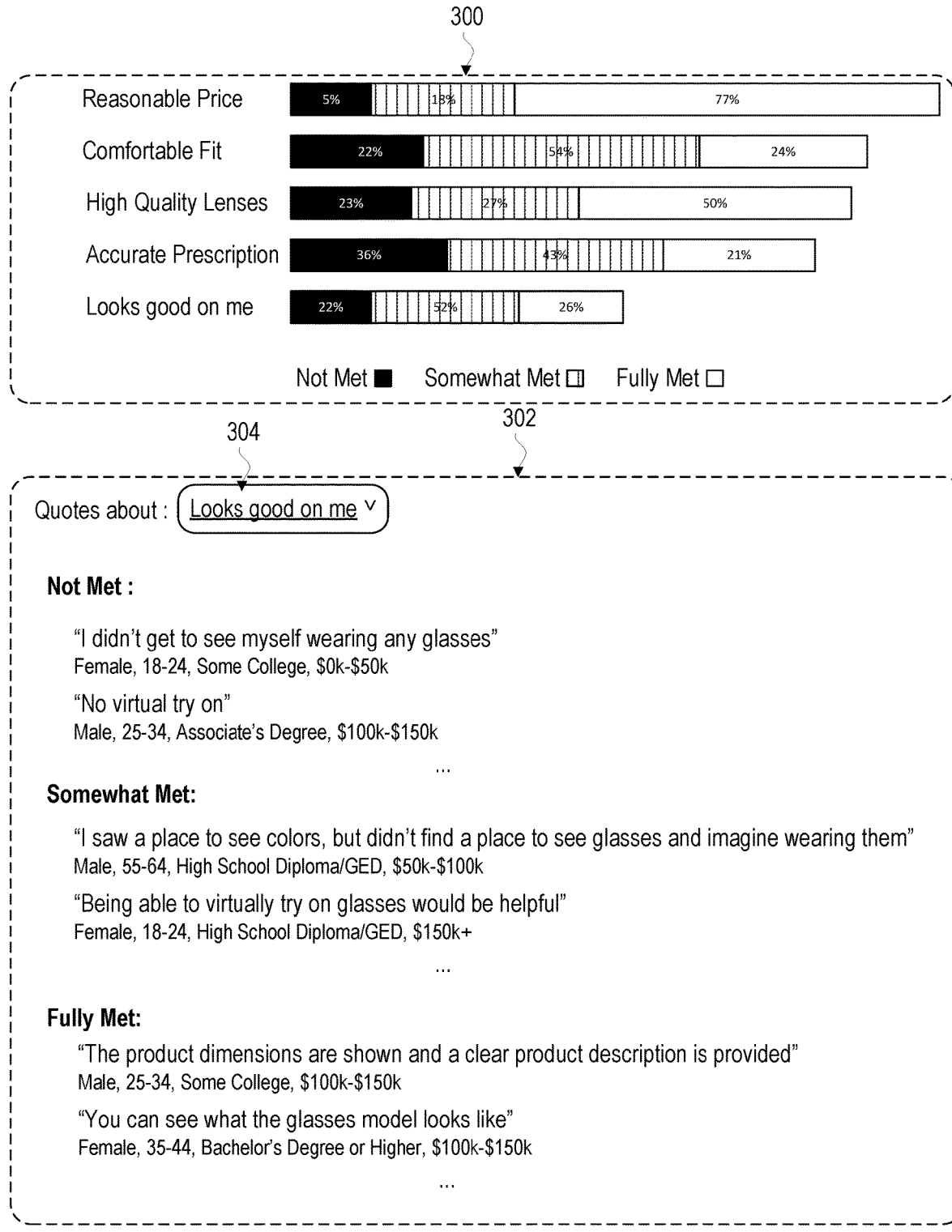
FIG. 3 illustrates a user interface for viewing and analyzing user expectation themes and insights in accordance with some embodiments.

FIG. 3 illustrates a user interface for viewing and analyzing user expectation themes and insights in accordance with some embodiments. The user interface includes histogram 300, with each histogram bin representing a different theme. In the present example, histogram 300 includes the top five themes predicted by a context-specific themer for a bifocal product. The themes include expectations with respect to the price, fit, lens quality, prescription accuracy, and aesthetics of the product. The length of each bin represents the number of expectation elements assigned to each theme. The bins are sorted by length, with the longest bin having the greatest number of expectation elements assigned. Each bin further depicts the distribution of expectation outcomes for the expectation elements assigned by the themer. The outcomes indicate whether the user's expectation for the theme were not met, somewhat met or fully met.

The user interface further includes display area 302, which presents representative outcome quotations for a selected theme outcome. The user may select different themes using interface control 304 or by selecting a bin from histogram 308, such as by clicking on the bin icon or associated label. In the present example, the top two outcome quotes are shown for the selected theme for three separate outcomes. However, the number of representative quotes that are presented may vary depending on the particular implementation. In some embodiments, the user may drill down further into a particular theme outcome to view additional representative quotations. The quotations may be sorted, filtered, and selected for presentation based on the selection scores output by the selector model. Each outcome quotation further includes additional data about the author of the quotation.

The themes and expectation elements that are presented may be used to guide product design optimizations. Analysts and product designers may quickly determine which themes are most relevant to user expectations and what the outcome is for those expectations. The representative outcomes may provide insights into the reasons why the outcomes occurred. For instance, in the example presented in FIG. 3, the model outputs may be processed to quickly determine that users would benefit from a virtualization feature through which users may virtually try on the product.

4. Learning and Model Maintenance

In some embodiments, themer 136 and selector 140 each include one or more ML models that are trained to learn and extrapolate from patterns within training datasets. With respect to themer 136, training service 128 may pick up on signals that are positively or negatively correlated with assigning expectation elements to a theme. The patterns may be based on the tokens (e.g., unigrams and n-grams) within expectation and/or outcome quotations, the position of the tokens relative to other tokens in the quotations, the presence/absence of frequently co-occurring tokens, the grammatical attributes associated with the tokens (e.g., what part-of-speech a token is, whether the token is a subject or object, whether the token is part of a phrase or clause, etc.), and the state at any preceding point in the sequence of tokens. Neural language models, such as transformer machine learning models and recurrent neural networks, may be trained to learn and extrapolate from such patterns present in a training dataset. Examples herein relate to training and applying bi-directional encoder representation for transformer (BERT) models. However, other types of machine learning models may also be trained and applied, depending on the particular implementation.

As previously noted, different machine learning models may be trained for different contexts. A particular context may be defined by one or more attributes or dimensions. Example dimensions may include the industry in which products are used, the product type, the features included in a product, the target application of the product, the target consumer base of a product, the target segment of a UX test, the facets of a user experience being tested, and attributes of the questions included in a UX test. For instance, B2B models may be trained for products that are targeting enterprises, and B2C models may be trained for products that are targeting individual consumers. As another example, different models may be trained for different industries, product types, product applications, UX test questions, and/or along other dimensions.

When training different models, the training data may be collected, divided, or otherwise separated across one or more dimensions. For example, expectation elements associated with products in one industry may be separated from quotations associated with products in a different industry. As another example, expectation elements for products targeting businesses consumers in a particular industry may be separated from expectation elements for products targeting retail consumers in the same industry. Conversely, a training dataset may exclude expectation elements that do not align with the context's dimensional boundaries (e.g., the expectation element is from a different industry, product category, consumer group, etc.). In some cases, there may be overlap between the training datasets, and an expectation element may be assigned to more than one group. The dimensional attributes used to group expectation elements may vary from implementation to implementation. The separate training datasets may then be used to train different ML models, which may include transformer language models such as DistilBERT models.

Figure 4:
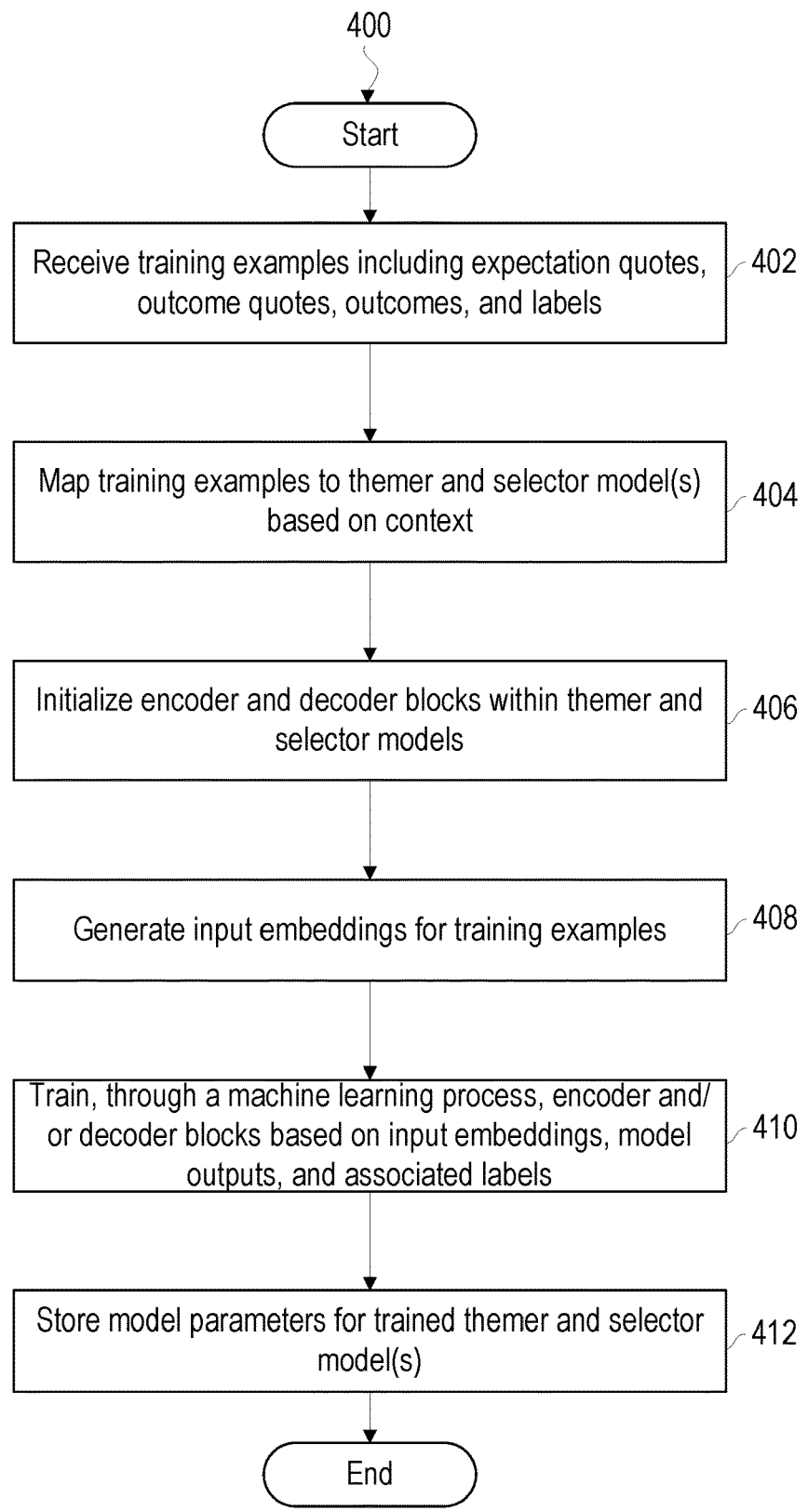
FIG. 4 illustrates a process for building and training neural language models in accordance with some embodiments.

FIG. 4 illustrates example process 400 for building a set of models that predict the visibility, quality, and/or relevance of qualitative elements based on training examples grouped by dimensional attributes in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

At operation 402, process 400 receives a set of training examples including expectation quotes, outcome quotes, outcomes, and labels. A label may include an indication of a theme selected for the example. Additionally or alternatively, the label may include a selection score for the qualitative element for one or more themes.

With supervised and semi-supervised learning, labels may be added or adjusted by an administrator. For example, a user may reassign themes that have been assigned and/or adjust which outcome quotations are visible. As another example, a user may input a selection score based on how relevant the quotation is to a particular context, such as how useful the quotation is for determining product design optimizations and the degree in quality of the quotation's contents. A higher score may reflect a higher selectability or quality. The scoring scale may vary depending on the particular implementation.

At operation 404, process 400 maps the training examples to one or more themer and/or selector models based on the context. In some embodiments, all expectation elements that share a set of dimensional attributes may be mapped to the same themer and/or selector while quotations with different dimensional attributes may be mapped to other models. As previously noted, the dimensional attributes that are used to separate expectation elements may vary.

At operation 406, process 400 initializes a set of encoder and decoder blocks within the themer and selector models. Process 400 may randomly initialize the blocks, use configurations from pre-training, or select configurations in any other manner. Encoders may comprise multiple layers, such as a self-attention layer and a feed forward neural network. Encoders may encode a sequence of n-grams within unstructured text based on various attributes, including semantic and syntactic features of the quotations. The encoder may map the input sequence to a context or attention vector based on learned patterns. The encodings may be provided to one or more decoders, which may comprise (a) an attention layer that provides greater weight to portions of an input sequence that are more predictive of the themes and selectability and (b) an output layer that models the conditional probability distribution giving the probabilities that the input vector sequences are associated with different themes within a schema.

At operation 408, process 400 generates input embeddings for the training examples. In some embodiments, process 400 generates an embedding for an example by tokenizing the quotations and converting each token into a machine learning vector according to a word embedding model. Process 400 may further add a positional encoding with each word embedding that indicates word positions within a quotation.

At operation 410, process 400 trains, through a machine learning process, the encoder and/or decoder block(s) based on the input embeddings, model output(s), and associated labels. In some embodiments, process 400 determines residuals between the transformer language model prediction output for quotations within the dataset and the label for the example. For example, process 400 may compute a difference between predicted selection scores and observed selection scores. As another example, process 400 may determine the difference between the predicted theme distributions and the observed theme distributions for set of test data.

Based on the residuals, process 400 may then adjust the model parameters, including parameters of the encoders and/or decoders, to minimize a loss function. For instance, a model may train and tune a neural network in an encoder and/or decoder using backpropagation. Backpropagation is a process of updating cell states in the neural network based on gradients determined as a function of the estimation error. With backpropagation, nodes are assigned a fraction of the estimated error based on the contribution to the output, and the node parameters (e.g., weights, bias values) may be adjusted based on the fraction. Thus, the weights of the connections between cells of a neural network may be adjusted in an unsupervised manner. Additionally or alternatively, connections may be added and/or removed between cells based on the estimation error. The adjustments may be made to reduce and minimize the estimation error of the model. In other embodiments, the process may use other machine learning algorithms to train and tune model parameters, such as regression analysis or other methods based on gradient descent.

At operation 412, process 400 stores the model parameters for the trained themer and/or selector model(s). In some embodiments, process 400 stores the encoder and decoder configurations for different transformers, where each transformer is mapped to a different set of one or more dimensional attribute values. Different ML models may pick up on different patterns within the different datasets that affect the ML model predictions. For example, a particular sequence of tokens may increase the selectability score and/or theme with one model but not another model. Additionally or alternatively, other patterns may impact the predicted differently in different contexts. Thus, when the same expectation element is fed to different ML models, the resulting predictions may vary, including the predicted themes and selectability for the specific context.

Figure 5:
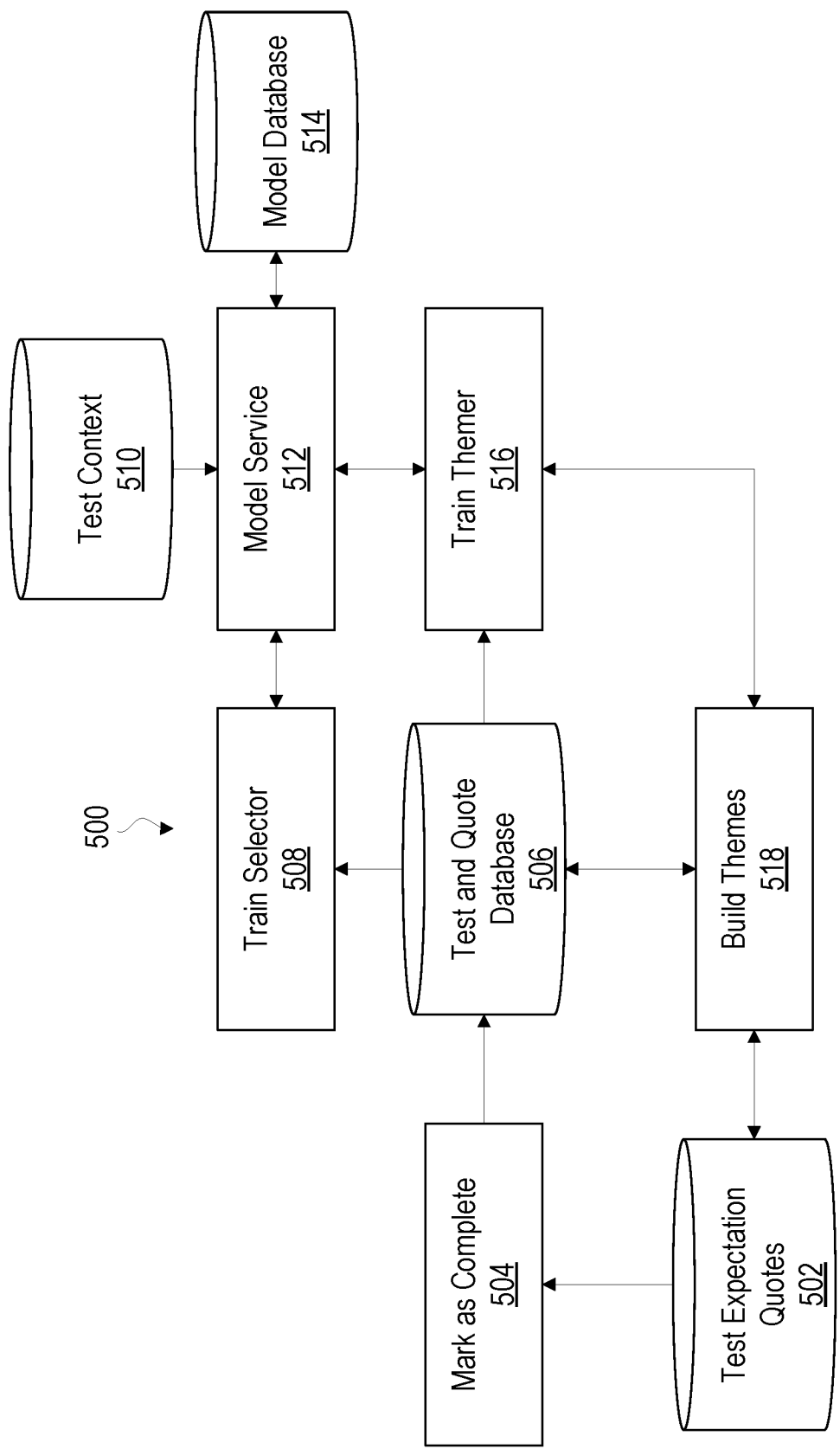
FIG. 5 illustrates a dataflow diagram for maintaining machine learning models in accordance with some embodiments.

FIG. 5 illustrates dataflow diagram 500 for maintaining machine learning models in accordance with some embodiments. Each component illustrated in FIG. 5 may be distributed over multiple applications and/or machines. In some embodiments, multiple components may be combined into one application and/or machine. Additionally or alternatively, operations described with respect to one component may instead be performed by another component. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, test expectation quotes 502 are collected from a UX test during or after test runtime. At operation 504, a UX test is marked as complete 504, and the test expectation quotes 502 are stored in test and quote database 506. In some embodiments, the processes described herein may be coupled to individual tests. For example, the models may be trained and/or applied each time a UX test is complete. As multiple tests may be running concurrently at a given time, the components described herein may include synchronization logic to prevent collisions.

Once the database records are updated in test and quote database 506, operation 508 is initiated to train and/or fine-tune the context-specific selector model. Additionally or alternatively operation 516 is initiated to train and/or fine-tune the context-specific themer model. Model service 512 may execute the training and/or tuning operations described herein using test context 410 and the model parameters stored in model database 414. This sequence allows the models to be updated upon completion of every test delivered to a customer.

In some embodiments, new themes may be added to a context-specific theme schema during test runtime or once a test has been completed. A theme builder tool, described further in the sections below, may include an interface that allows users to set the labels of the data in the active test and/or update historical tests. At operation 518, the updated themes are built and stored in test and quote database 506. The new and updated theme schema may be used at operation 516 to train and/or fine-tune the context-specific themer model. The updated models may be used on triggered theme predictions.

In some embodiments, a maximum lookback may be applied during the training process. For example, expectation elements that are from UX test results older than a threshold age (e.g., six months, one year, etc.) may be filtered from the training dataset. When the model is fine-tuned, the training process does not consider data older than the maximum lookback age threshold. Thus, training may be local in time, allowing the trainer and selector to "forget" older patterns and quickly adapt to evolving UX expectations. However, in other embodiments, the training data may include all historical data or may time-weight the historical data such that more recent data is given greater weight when training the ML models.

In some embodiments, ML model predictions and parameters may be adjusted based on a feedback loop. The feedback may include input from system administrators and/or end users viewing the predictions. For example, an analyst may adjust a visibility, quality, or relevance score of a given quotation. Additionally or alternatively, the analyst may change the distribution of which quotations are visible and which quotations are hidden. The results may be compared with predictions to determine a model estimation error. Based on the error, adjustments may be made to the model weights and/or other parameters to improve model robustness and accuracy.

Figure 6:
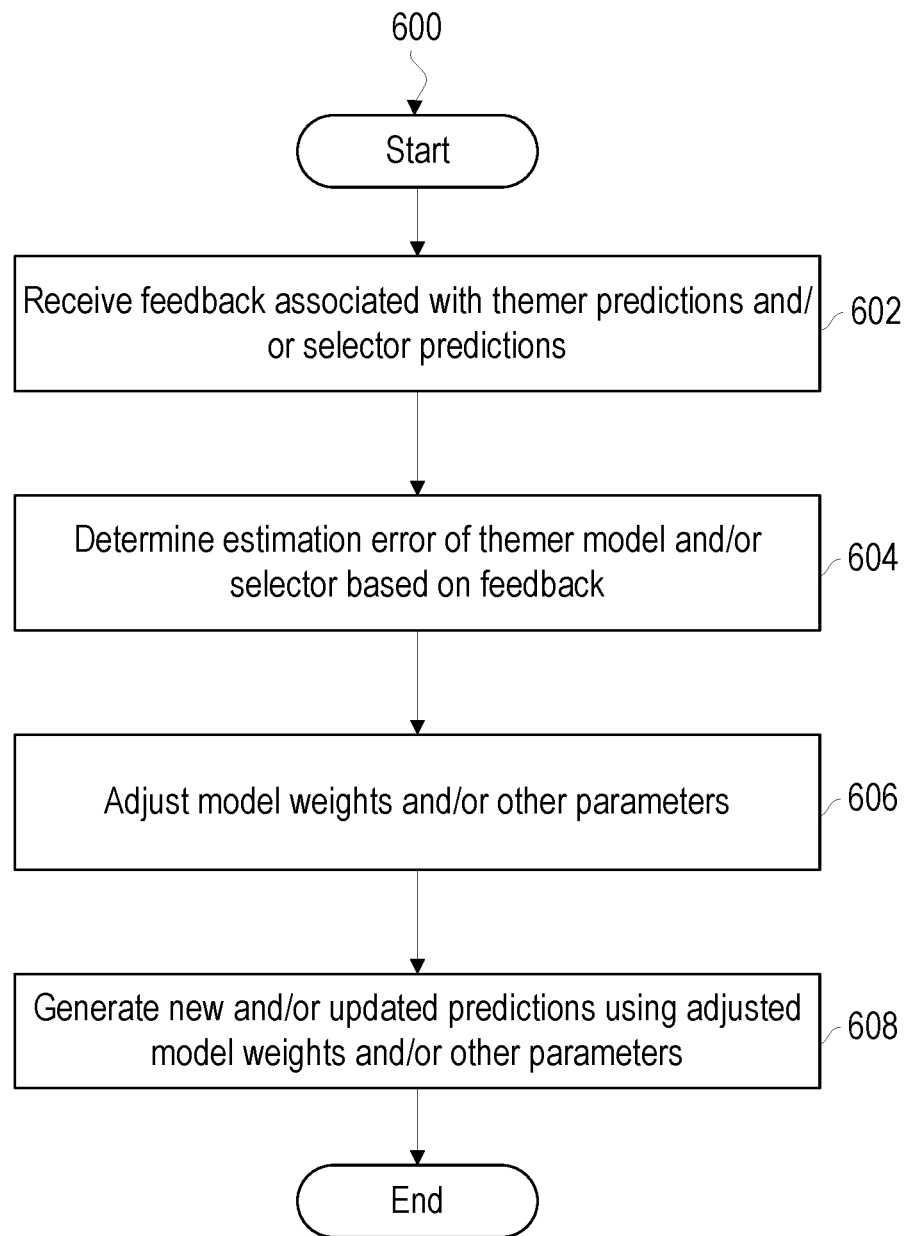
FIG. 6 illustrates a process for tuning machine learning models in accordance with some embodiments.

FIG. 6 illustrates process 600 for tuning machine learning models in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

At operation 602, process 600 includes receiving feedback associated with one or more predictions output by a ML model, such as a translator language model. In some embodiments, the feedback comprises adjustments to a visibility, quality, or relevance score. For example, an analyst may increase or decrease the score predicted for the quotation. Additionally or alternatively, the feedback may comprise an updated distribution of which qualitative elements from a set of UX test results are visible and hidden.

At operation 604, process 600 determines an estimation error of the model based on the received feedback. The estimation error may be determined by computing a difference between the adjusted and predicted value of a score. Additionally or alternatively, the estimation error may be determined based on a difference between the predicted and observed visibility distributions for set of UX test results.

At operation 606, process 600 adjusts the model weights and/or other parameters based on the estimation error. For instance, a model may train and tune a neural network using backpropagation. As previously noted, backpropagation is a process of updating cell states in the neural network based on gradients determined as a function of the estimation error. In other embodiments, the process may use other machine learning algorithms to train and tune model parameters, such as regression analysis or other methods based on gradient descent.

At operation 608, process 600 generates new and/or updated predictions using the adjusted model weights and/or other parameters. For example, cell weights within a neural network of an encoder and/or decoder block may be adjusted. Additionally or alternatively, parameters of the attention layer and/or other configurations of the various blocks may be tuned.

In some embodiments, the set of ML models may be retrained periodically to forget older data. For example, the training process depicted in FIG. 6 may be executed monthly using only UX test results that have been received within a threshold timeframe. This allows the predictions to adapt more quickly to trending and evolving standards. However, in other embodiments, the training process may use all available historical data during training. The data may be time-weighted to reduce the impact of older data on the learning process, or the data may be equally weighted.

In some embodiments, the tuning and/or training processes described herein may use pretrained models. For example, a pretrained DistilBERT model may be used to reduce the processing overhead associated with building the themer and/or selector models. For the selector training, the pretrained model may be fine-tuned for a few epochs every time a test is marked as complete. This fine-tuning may be performed because the number of selected expectation elements is generally much smaller than the total number of collected expectation elements, and it may help minimize the likelihood of overtraining. The selector model may be trained to detect signals for selectability rather than looking for the exact quotations that are eventually selected.

In some embodiments, when (a) a test is completed, (b) there is an existing themer for the test context, and (c) there are no new themes in a completed test, the existing themer model is fine-tuned on historical and newly contributed data. Fine-tuning the themer in this manner allows the model to converge over time. If a new theme is present or explicitly triggered by the theme builder tool, a pretrained model may be fetched and fine-tuned on the available data. This mode allows the themer to learn new themes and have a reset path in case overtraining occurs.

In some embodiments, ML engine 126 may be configured to use the most recently published models available. Thus, when respondent data is available for a particular UX text, the latest themer and selector models for that context are applied to generate predictions and render the user interface. If the models are updated between the time and a later user interface triggered executions, then the latest updated model may be used. There may be automated and/or manual update triggers that result in publication of the new models. For example, a routine may trigger an update automatically each time a new UX test is complete. Additionally or alternatively, updates may be explicitly requested by an analyst or other end user.

5. Example User Interface for Building and Modifying Themes

As previously noted, a theme builder tool may include an interface that allows users to set the labels of the data in an active test and/or update historical tests. For example, users may define new themes within a schema, modify existing themes, delete themes, and/or relabel theme assignments. The theme builder may further allow the user to modify the representative quotes for theme outcomes and/or modify the selectability scores assigned to the quotes. The feedback may be used to retrain and/or fine-tune the model, such as by executing process 400 and/or process 600.

Figure 7:
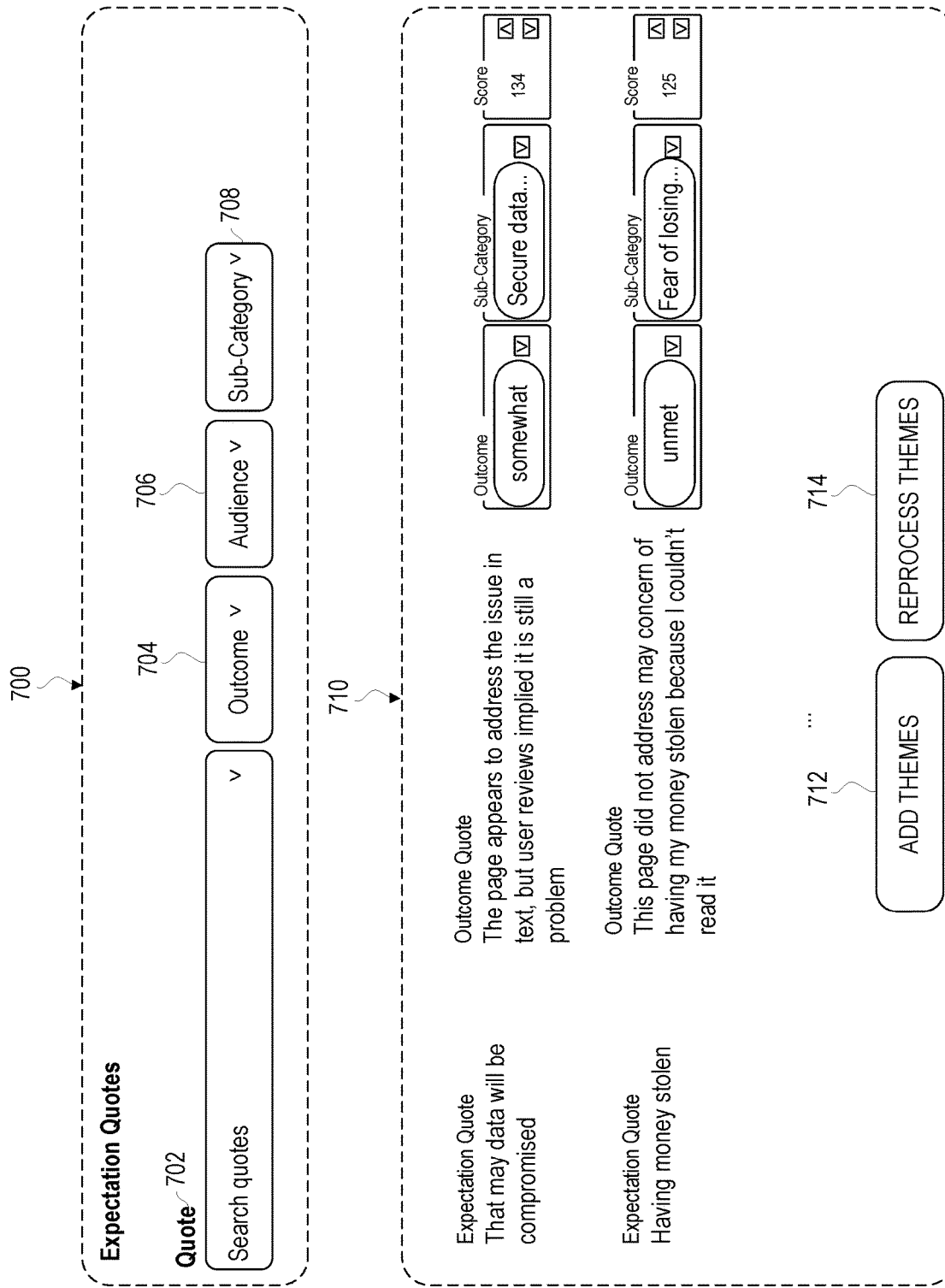
FIG. 7 illustrates a user interface for providing feedback and updating model predictions in accordance with some embodiments.

FIG. 7 illustrates a user interface for providing feedback and updating model predictions in accordance with some embodiments. Query interface 700 includes search bar 702, outcome filter 704, audience filter 706, and sub-category filter 708. Users may input one or more keywords into search bar 702 to search for expectation and/or outcome quotes in the test result data. The outcome filter 704 may restrict the search to expectation elements with a particular outcome (e.g., met, somewhat met, unmet). Audience filter 706 may restrict the results to quotations authored by respondents with specified attributes, such as within a specified age range, income range, education, etc. Sub-category filter may direct the search to expectation elements assigned to one or more themes.

The search results are displayed in display area 710. Each result corresponds to an expectation element that matches the search criteria and filters. Each result includes an expectation quote describing a user expectation (e.g., "That may data will be compromised"), an outcome quote (e.g., "The page appears to address the issue in text, but user reviews implied it was still a problem") an outcome (e.g., "Somewhat met") a theme (e.g., "Data security"), and a selection score (e.g., "134"). The user may interact with the user interface to change the outcome, theme, and/or selection score for one or more expectation elements.

Display area 710 further includes buttons 712 and 714 to modify and reprocess themes. For example, a user may select button 712 to add, remove and/or modify themes from the schema. In response to selecting button 712, the user may be presented with a list of themes defined for the context-specific schema. The user interface may include an input field to add a new theme label/classifier to the schema. Once added, the user may reassign one or more expectation elements to the new theme.

After updating the schema, theme assignments, and/or selection scores, a user may select button 714 to reprocess the theme based on the feedback. In response, the interface may invoke the training and/or tuning process described above to retrain and/or fine-tune the underlying ML models. The user may navigate to the interface depicted in FIG. 3 to view updated themes and/or representative outcome quotations using the new themer and/or selector model parameters. When the user selects button 714, any new UX test data that was received and not previously incorporated into the synthesized results may be included when the updated ML models are applied.

6. Recommendations and Additional Applications

In some embodiments, the system may provide recommendations and/or trigger actions directed to optimizing a product based on the theme predictions and/or selected expectation elements. The recommendations and/or actions that are triggered may vary depending on which quotations are included in the set. For instance, responsive to detecting the quotations presented in display area 302 of FIG. 3, recommendation engine 114 may present, via frontend interface 112, recommended changes to add a virtualization option to a product webpage that allows users to virtually try on a product. Recommendation engine 114 may parse the result set to identify commonalities in the quotations and present the top recommended actions based on which design changes are most frequently suggested. Recommendation engine 114 may limit the analysis for commonalities to the representative quotations or quotations with a selection score above a threshold. By limiting the analysis to the highest quality expectation elements, processing overhead on the system may be reduced while the overall insight quality is improved.

Additionally or alternatively, the system may populate an analyst's work queue based on the qualitative elements from the final visible or relevant. Analysts for third-party service providers often review the results of UX tests before sending synthesized results to the product design team which hired the analysts. The themer and selector may reduce the analyst's workload and turnaround time by predicting the themes most relevant to a product and hiding extraneous results. For example, an analyst may be presented with the top n highest quality outcome quotes to review rather than having to manually sift through thousands of results.

Additionally or alternatively, expectation elements may be sorted and presented by score. For example, a list presented to an analyst may include quotations predicted to be the highest quality at the top with lower-quality quotes closer to the bottom. Quotations scored below a threshold selection score may be cutoff or presented at the end of the list. Thus, quotations that provide the most helpful insights may be presented more prominently than those with little or no useful information.

Additionally or alternatively, the themer and/or selector outputs may be consumed by other downstream applications, which may process the data to perform additional analytics and/or trigger additional actions. For example, downstream applications may search for patterns in the selected quotations to formulate predictions, recommendations, and/or other analytic insights. The applications may further execute actions based on the set of quotations such as updating user interface 104, functional elements 106, and/or aesthetic elements 108 in a manner that is predicted to improve the user experience test results.

7. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
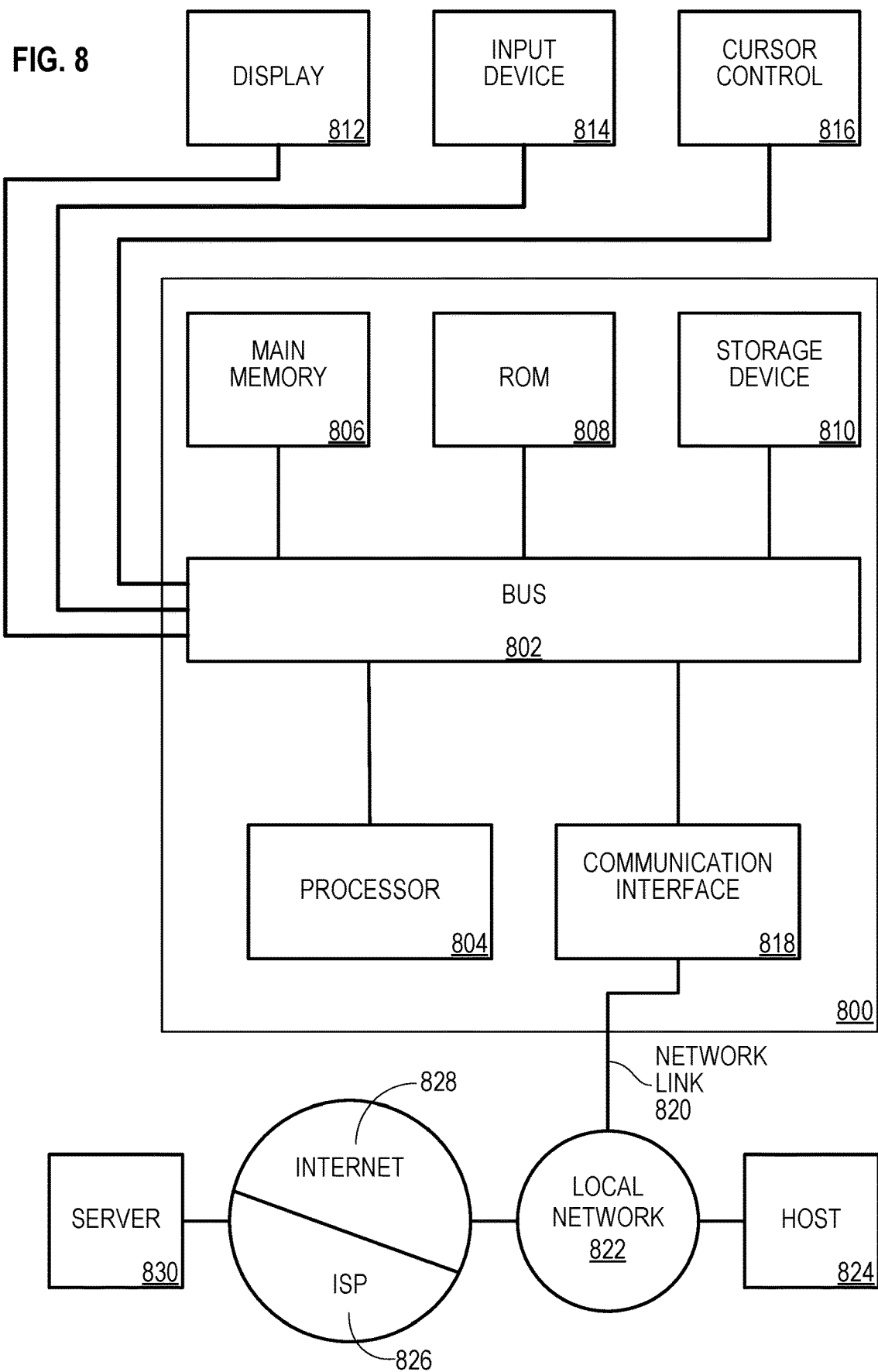
FIG. 8 illustrates a computer system in accordance with some embodiments.

For example, FIG. 8 illustrates a computer system in accordance with some embodiments. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

10. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving input defining or modifying a theme schema for classifying results of user experience tests;
responsive to receiving the input, training a machine learning model based at least in part on example classifications in a training dataset using the theme schema, wherein the theme schema defines a set of labels that the machine learning model uses to learn patterns in the training dataset;
receiving a new set of results for a user experience test associated with a particular product;

generating, by the trained machine learning model based on the new set of results, a set of predicted themes for the user experience test;

wherein generating the set of predicted themes for the user experience test includes: generating at least one machine learning vector for the new set of results using at least one word embedding for at least one token extracted from at least one response in the new set of results to a test prompt, feeding the at least one machine learning vector to at least one encoder block of the trained machine learning model to generate at least one encoder vector representation, and feeding the at least one encoder vector representation to at least one decoder block of the trained machine learning model to determine a probability distribution associated with the theme schema that identifies predicted probabilities that the at least one machine learning vector input to the trained machine learning model is associated with different themes in the theme schema;

wherein the predicted themes are determined based at least in part on the probability distribution determining a set of residuals based on a difference between the theme distribution predicted by the trained learning model and an observed theme distribution; and adjusting a parameter of at least one of the at least one encoder block or the at least one decoder block based on the set of residuals to minimize a loss function.

2. The method of claim 1, wherein the new set of results include unstructured data that does not conform to the theme schema; wherein the set of predicted themes is generated based at least in part on the unstructured data.

3. The method of claim 1, wherein the new set of results includes a set of expectation elements, wherein each expectation element specifies an expectation for a user experience and a respective outcome for the user experience, wherein the set of predicted themes is generated based at least in part on the expectation for the user experience and the respective outcome for the user experience specified by each expectation element.

4. The method of claim 3, wherein the expectation is specified in a first set of unstructured text that does not conform to any schema and the outcome is specified in a second set of unstructured text that does not conform to any schema; wherein the trained machine learning model generates the set of predicted themes based on patterns learned from unstructured text in the training dataset.

5. The method of claim 4, wherein the patterns are determined based at least in part on a position of tokens within the unstructured text in the training dataset and the example classifications.

6. The method of claim 1, further comprising: determining a distribution of user expectations across a plurality of themes in the theme schema based on the set of predicted themes for the user experience test; generating a graphical user interface based at least in part on the distribution of user expectations across the plurality of themes.

7. The method of claim 6, wherein the graphical user interface includes at least one histogram that is generated based at least in part on the distribution of user expectations across the plurality of themes and a distribution of outcomes associated with at least a subset of the plurality of themes.

8. The method of claim 1, further comprising: receiving feedback that modifies a selection score for at least one expectation element; responsive to receiving the feedback, tuning one or more parameters of a second machine learning model; and generating updated selection scores using the updated one or more model parameters associated with the second machine learning model.

9. The method of claim 1, further comprising: generating, by a recommendation engine, at least one recommendation for optimizing a product based at least in part on the set of predicted themes for the user experience test.

10. One or more non-transitory computer-readable media storing instructions which, when executed by one or more hardware processors cause:

receiving input defining or modifying a theme schema for classifying results of user experience tests;

responsive to receiving the input, training a machine learning model based at least in part on example classifications in a training dataset using the theme schema, wherein the theme schema defines a set of labels that the machine learning model uses to learn patterns in the training dataset;

receiving a new set of results for a user experience test associated with a particular product;

generating, by the trained machine learning model based on the new set of results, a set of predicted themes for the user experience test;

wherein generating the set of predicted themes for the user experience test includes: generating a least one machine learning vector for the new set of results using at least one word embedding for at least one token extracted from at least one response in the new set of results to a test prompt, feeding the at least one machine learning vector to at least one encoder block of the trained machine learning model to generate at least one encoder vector representation, and feeding the at least one encoder vector representation to at least one decoder block of the trained machine learning model to determine a probability distribution associated with the theme schema that identifies predicted probabilities that the at least one machine learning vector input to the trained machine learning model is associated with different themes in the theme schema;

wherein the predicted themes are determined based at least in part on the probability distribution;

determining a set of residuals based on a difference between the theme distribution predicted by the trained learning model and an observed theme distribution; and adjusting a parameter of at least one of the at least one encoder block or the at least one decoder block based on the set of residuals to minimize a loss function.

11. The media of claim 10, wherein the new set of results include unstructured data that does not conform to the theme schema; wherein the set of predicted themes is generated based at least in part on the unstructured data.

12. The media of claim 10, wherein the new set of results includes a set of expectation elements, wherein each expectation element specifies an expectation for a user experience and a respective outcome for the user experience, wherein the set of predicted themes is generated based at least in part on the expectation for the user experience and the respective outcome for the user experience specified by each expectation element.

13. The media of claim 12, wherein the expectation is specified in a first set of unstructured text that does not conform to any schema and the outcome is specified in a second set of unstructured text that does not conform to any schema; wherein the trained machine learning model generates the set of predicted themes based on patterns learned from unstructured text in the training dataset.

14. The media of claim 13, wherein the patterns are determined based at least in part on a position of tokens within the unstructured text in the training dataset and the example classifications.

15. The media of claim 10, further comprising: determining a distribution of user expectations across a plurality of themes in the theme schema based on the set of predicted themes for the user experience test; generating a graphical user interface based at least in part on the distribution of user expectations across the plurality of themes.

16. The media of claim 15, wherein the graphical user interface includes at least one histogram that is generated based at least in part on the distribution of user expectations across the plurality of themes and a distribution of outcomes associated with at least a subset of the plurality of themes.

17. The media of claim 10, further comprising: receiving feedback that modifies a selection score for at least one expectation element; responsive to receiving the feedback, tuning one or more parameters of a second machine learning model; and generating updated selection scores using the updated one or more model parameters associated with the second machine learning model.

18. The media of claim 10, wherein the instructions further cause: receiving an update to the theme schema from a user through a graphical user interface; and responsive to receiving the update to the theme schema, retraining the machine learning model to learn patterns using at least one new label associated with the update to the theme schema.

19. A system comprising:
one or more hardware processors;
one or more non-transitory computer-readable media storing instructions which, when executed by the one or more hardware processors cause:
receiving input defining or modifying a theme schema for classifying results of user experience tests;
responsive to receiving the input, training a machine learning model based at least in part on example classifications in a training dataset using the theme schema, wherein the theme schema defines a set of labels that the machine learning model uses to learn patterns in the training dataset;
receiving a new set of results for a user experience test associated with a particular product;
generating, by the trained machine learning model based on the new set of results, a set of predicted themes for the user experience test;
wherein generating the set of predicted themes for the user experience test includes: generating at least one machine learning vector for the new set of results using at least one word embedding for at least one token extracted from at least one response in the new set of results to a test prompt, feeding the at least one machine learning vector to at least one encoder block of the trained machine learning model to generate at least one encoder vector representation, and feeding the at least one encoder vector representation to at least one decoder block of the trained machine learning model to determine a probability distribution associated with the theme schema that identifies predicted probabilities that the at least one machine learning vector input to the trained machine learning model is associated with different themes in the theme schema;
wherein the predicted themes are determined based at least in part on the probability distribution;
determining a set of residuals based on a difference between the theme distribution predicted by the trained learning model and an observed theme distribution; and
adjusting a parameter of at least one of the at least one encoder block or the at least one decoder block based on the set of residuals to minimize a loss function.

\* \* \* \* \*